United States Patent [19]
Biermann et al.

[11] Patent Number: 5,868,829
[45] Date of Patent: Feb. 9, 1999

[54] METHODS OF MANUFACTURING HYDRAULIC MATERIALS

[75] Inventors: Joseph Jan Peter Biermann, Huis Ter Heide; Robert Bleijerveld, Rotterdam; Nicolaas Voogt, Beekbergen; Hendrik Jacobus Hulscher, Cuyk, all of Netherlands

[73] Assignee: CDEM Holland, B. V., Doetinchem, Netherlands

[21] Appl. No.: 636,598

[22] Filed: Apr. 23, 1996

Related U.S. Application Data

[63] Continuation of PCT/NL95/00280.

[51] Int. Cl.⁶ .................................................. C04B 33/04
[52] U.S. Cl. .................. 106/632; 106/416; 106/486; 501/144; 501/145; 501/150
[58] Field of Search .................... 106/632, 416, 106/486; 501/144, 150, 145

[56] References Cited

U.S. PATENT DOCUMENTS

| | | | |
|---|---|---|---|
| 4,034,058 | 7/1977 | Jameson et al. | 423/118 |
| 4,600,437 | 7/1986 | Sugiura et al. | 106/38.3 |
| 5,393,340 | 2/1995 | Slepetys et al. | 106/484 |

FOREIGN PATENT DOCUMENTS

| | | |
|---|---|---|
| 1005929A3 | 3/1994 | Belgium . |
| 2642747 | 2/1989 | France . |
| 1771879 | 2/1972 | Germany . |
| 3838379A1 | 6/1989 | Germany . |
| 407309617 | 11/1995 | Japan . |
| 394518 | 7/1933 | United Kingdom . |
| PCT/NL95/00280 | 11/1995 | WIPO . |

OTHER PUBLICATIONS

Tigges, K.D. et al., "Operating Experiences From the Fluidized Bed Steam Generators at Lüneburg Heating Power Station", VDI Berichte 601, pp. 44, 47, (1986).

Langhoff, J. et al., "Operational Experience with the AFB-C–Plant König Ludwig Under Automatic Control", 601, pp. 32–41, (1986).

Wüster, G., et al., "4 MW Fluidized Bed Combustion Unit for District Heating at Heizwerk Laurweg", VDI Berichte 601, p. 90, (1986).

Rehwinkel, et al., "Stationäre Und Zirkulierende Druckwirbelschichtfeuerung: Versuchsergebenisse Und Anlagenkonzepte", Deutsche Babcock, Wirbelschichtsysteme, VGB Konferenz 1992, p. 3, 1992.

Leithner, R., "Betriebserfahrungen Und Zukünftige Entwicklung Von Dampferzeugern Mit Wirbelschichtfeuerungen", Wirbelschichtsysteme, VGB Konferenz 1992, p. 29, 1992.

Gondermann, B., "Wirbelschichttechnik—Design for the Sludge Incinerator of the Wuppertal Community", TSOA, p. 80 (1977—revamped 1993).

Anthony, E. J., "The Technical, Environmental and Economic Feasibility of Recovering Energy from Paper Mill Residue Fiber", vol. 1, ASME, (1993).

McCulloch, J.L., et al., "Fluid Bed Combustion Helps Dispose Deink & Mill Treatment Plant Sludge", Issue 940901, (1994).

*Primary Examiner*—Paul Marcantoni
*Attorney, Agent, or Firm*—Wolf, Greenfield & Sacks, P.C.

[57] ABSTRACT

A method of making a hydraulic material which contains metakaolinite and calcium hydroxide from a kaolin-containing compound. The method is performed in a fluidized bed installation having a freeboard under conditions such that the amount of calcium oxide formed is minimized. Preferably, the method is performed at a fluidized bed temperature of 780° C. and a freeboard temperature of no more than 780° C. By minimizing the amount of calcium hydroxide formed, the use of an additional installation for converting calcium oxide to calcium hydroxide is avoided. The starting material is typically waste paper and other residues from recycling of waste paper for reuse in the paper industry. The product may be used to form concrete having a high compression strength.

18 Claims, 1 Drawing Sheet

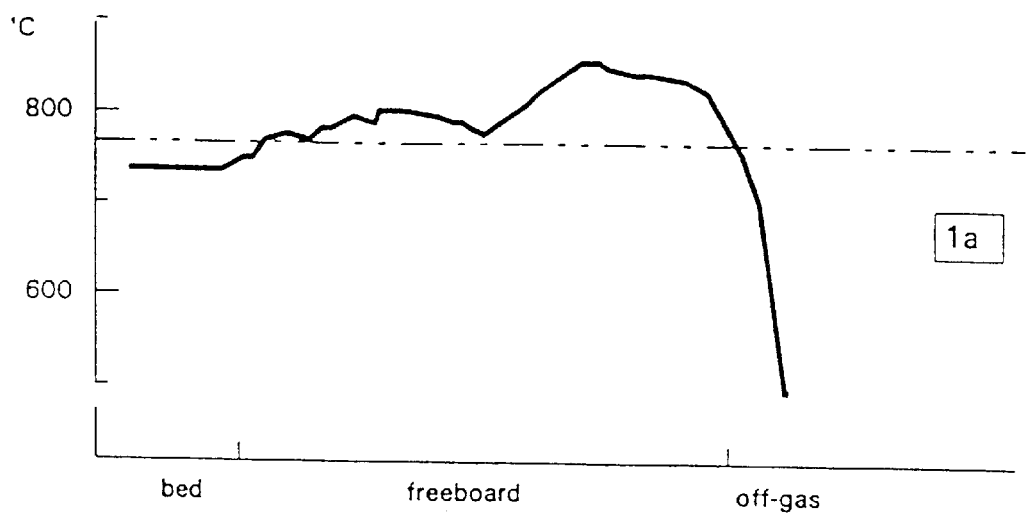
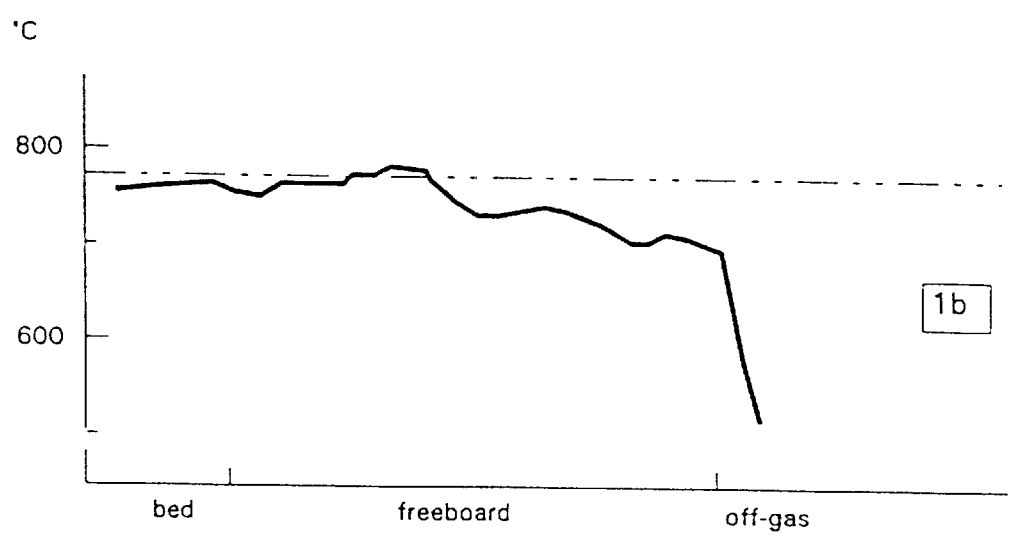
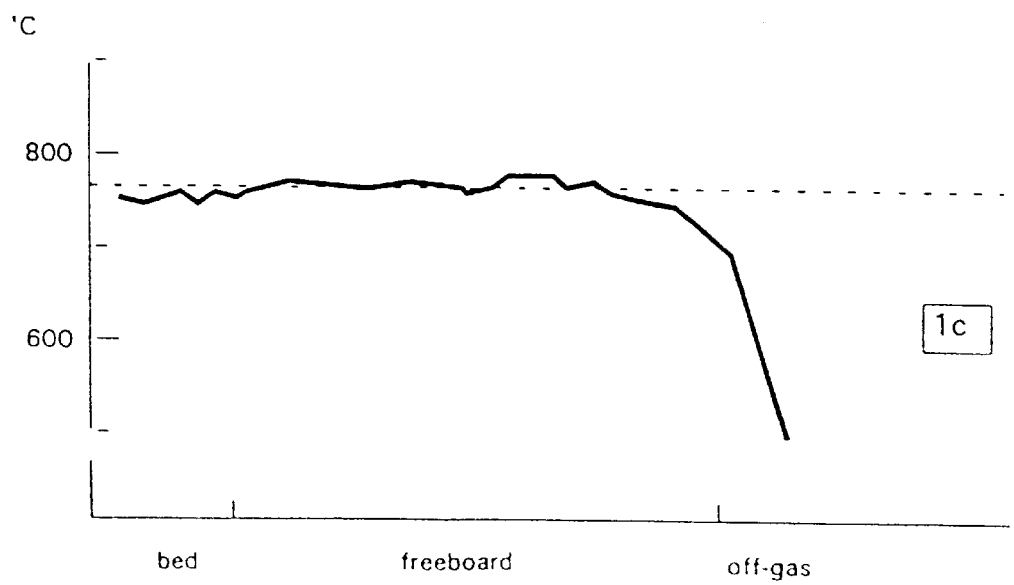

METHODS OF MANUFACTURING HYDRAULIC MATERIALS

CROSS REFERENCE TO RELATED APPLICATIONS

The present application is a continuing application claiming priority under 35 U.S.C. §120 to PCT application number PCT/NL95/00280, the entire disclosure of which is incorporated herein by reference, designating the United states, filed Aug. 24, 1995, which PCT application in turn claims priority under 35 U.S.C. §119 to Netherlands patent application number 9401366, filed Aug. 24, 1994.

Background

The present invention relates generally to methods of manufacturing and using materials comprising meta-kaolin, and more specifically to such methods which include a thermal treatment in a fluidized bed installation comprising a freeboard. In particular, the invention relates to methods using waste paper or residues that stem from recycling of waste paper for reuse in the paper industry.

Description of the Related Art

A method of manufacturing a hydraulic material is disclosed in DE OS 38 38 379. According to this method, paper residue is incinerated in a fluidized bed at a temperature above 400° C., preferably at 800° C. to 1000° C. The resulting sludge paper ash is used in the manufacture of sandlime brick. The sludge paper ash obtained at 800° C. to 1000° C. is added in an amount of 0.5% to 2% to mortar of lime and sand. Sandlime brick manufactured with such mortar no longer expands or shrinks under the influence of moisture.

SUMMARY OF THE INVENTION

The invention provides a method for the thermal conversion of kaolin-containing material to a material of puzzolanic properties, the kaolin-containing material being thermally treated in a fluidized bed installation having a freeboard in the presence of oxygenous gas, wherein the kaolin-containing material used is waste paper or residues that stem from recycling waste paper for reuse in the paper industry, and the fluidized bed is operated at a temperature between 720° and 850° C. and the temperature of the freeboard is 850° C. or lower, and that the fluidized bed is provided with means for promoting heat transfer.

The meta-kaolin containing material of the present invention is understood to be a material possessing hydraulic and/or the hydraulic properties of other material strengthening properties.

The present invention provides in one aspect a method of manufacturing a hydraulic material from a kaolin-containing material. The kaolin containing material is thermally treated in a fluidized bed reactor at a temperature of 720° C. to 850° C. The kaolin-containing material is further treated in a freeboard of the fluidized bed at a temperature of at most 850° C. Preferably, the fluidized bed includes a heat transfer agent. The invention results in a product with improved properties versus the prior art. Metakaolinite is desirably produced and, also desirably, calcium oxide is converted to calcium hydroxide.

Certain advantages can be obtained by controlling various parameters, including the temperature of the fluidized bed, the temperature of the freeboard, the amount of time the starting materials spends in the fluidized bed, the amount of time the starting material spends in the freeboard and the water content in the freeboard.

According to one aspect of the invention, an improved hydraulic material having a reduced amount of calcium oxide is provided.

According to another aspect of the invention, an improved hydraulic material having an increased amount of metakaolinite is provided.

According to still another aspect of the invention, a method for the manufacture of cement is provided. The hydraulic material of the invention is added as the usual starting material, or as part of the usual starting materials in the manufacture of cement.

BRIEF DESCRIPTION OF THE DRAWINGS

The objects, features and advantages of the present invention will be more readily appreciated when taken in conjunction with the accompanying figures, in which:

FIG. 1A is a graphical representation of the temperature distribution in a fluidized bed installation during the thermal processing of paper residue;

FIG. 1B is a graphical representation of the temperature distribution in a fluidized bed installation during the thermal processing of paper residue, wherein the freeboard of the fluidized bed installation does not have an insulation sheath; and FIG. 1C is a graphical representation of the temperature distribution in the fluidized bed installation of FIG. 1A during the thermal processing of paper residue, wherein the fluidized bed installation further includes a compaction screw for the conveyance of the paper residue.

DETAILED DESCRIPTION

According to the present invention, a meta-kaolin containing material is manufactured using a fluidized bed installation having a freeboard. The temperature in the fluidized bed and the freeboard are accurately controlled during processing, and the meta-kaolin material comprises metakaolinite and calcium hydroxide with a reduced amount of calcium oxide. It is desirable to reduce the amount of calcium oxide present in the meta-kaolin material because calcium oxide has a detrimental effect on the strength of this hydraulic material and cement formed therefrom. In part, calcium oxide production is reduced by the presence of water that is released by the starting materials during incineration or that is added during the manufacturing process. As a result, a separate installation for the conversion of calcium oxide into calcium hydroxide can be avoided, reducing the costs associated with manufacturing hydraulic materials.

The hydraulic material is suitable as cement or as one of the components of cement. By "hydraulic material" it is herein meant to refer to a material that is capable of reacting with water to form hydrates, thereby solidifying. The term "cement" as used herein denotes dry or wet cement products which may or may not include gravel or other additives commonly found in cement or concrete products.

Starting materials appropriate for use in the present invention include kaolin containing compounds, such as waste paper or paper residue derived from the recycling of waste paper for reuse in the paper industry. The paper residue may be "inferior" residue, that is, residue that on average may include materials that have too short a fiber length and also may be sludge from waste water purification plants.

According to the present invention, the starting material is incinerated in a fluidized bed installation having a freeboard.

The temperature of the fluidized bed is preferably 750° C. to 800° C., more preferably 780° C., and the temperature in the freeboard should be less than or equal to the temperature of the fluidized bed. Concrete manufactured using the hydraulic material of this invention prepared at this temperature has the greatest compression strength.

The incorporated paper residue has a water content of 25% to 75% by weight in relation to the total. Preferably, all of the kaolin is converted to metakaolin.

Table A illustrates the compression strength of concrete manufactured with hydraulic material prepared at different temperatures according to the method of the present invention. The concrete is prepared by mixing one part hydraulic material, one part calcium hydroxide, 5.4 parts standard sand and two parts water according to EN 196. These components are mixed for three minutes and subsequently densified according to EN 196. The compression strength is measured after hardening the mixture for 28 days. Table A demonstrates that the compression strength of the concrete is optimized when an incineration temperature of 780° C. is used. In addition, Table A shows that the compression strengths of concretes are comparable when an incineration temperature of 780° C. or 800° C. are used. A temperature of 780° C. is preferred because compression strength is less sensitive to changes in temperature. It should be noted that the concretes listed in Table A also showed good green strength.

TABLE A

| Fluidized bed temperature °C. | Compression strength MPa |
| --- | --- |
| 720 | 3.66 ± 0.15 |
| 760 | 3.84 ± 0.09 |
| 780 | 4.24 ± 0.17 |
| 800 | 4.23 ± 0.09 |
| 850 | 2.81 ± 0.09 |

In certain embodiments, it is desirable to control the grain size distribution of the hydraulic materials of the present invention. For such embodiments, the grains can be manufactured to have a diameter less than 250 μm, with 90% of the grains having a diameter less than 64 μm. During processing, the grains may be carried along with the waste gases and further can be seprated into a coarse and a fine fraction. The coarse fraction may be mixed into the paper resudue anbd fed back into the fluidized bed installation where it is reduced in size during processing.

Particulate heat transfer agents can be added to the fluidized beds during processing, but these particulate heat transfer agents can get blown out during processing and end up in the product. Replenishing of the heat transfer agent then also is required. Such particulate heat transfer agents include, for example, sand, slate, metakaolinite and other, typically inorganic and inert, heat transfer agents that are known to those skilled in the art. According to the method of the present invention, the problem of product contamination by a heat transfer agent is reduced or eliminate because the method of the present invention, surprisingly, produces a material that can act as a particulate heat transfer agent. This particulate heat transfer agent is similar the hydraulic material of the present invention. Thus, any of this particulate heat transfer agent that gets blown into the product does not act as a pollutant to the final product. There is also no need to replenish the particulate heat transfer agent that was discharged and mixed with the product as it is self-replenishing as a by-product of the manufacturing process.

The heat distribution in the fluidized bed installation can be further improved by using a compaction feeder. This reduces spark formation and makes it more difficult for the paper residue to disintegrate during processing. One example of such a compaction feeder is a screw conveyor with a constricted opening discharging into the fluidized bed installation. The use of this compaction feeder can improve combustion performance, consequently increasing the homogeneity of the heat distribution.

Table B illustrates the emission and compression characteristics for hydraulic materials formed as described in Table A using different embodiments of a fluidized bed installation. In addition, FIGS. 1A–1C demonstrate the temperature distribution in these different fluidized bed installations.

FIG. 1A depicts the temperature distribution in a fluidized bed installation during the thermal processing of paper residue. Even with applied cooling of the freeboard, the temperature of the freeboard rises to 900° C. resulting in a material having inferior hydraulic properties.

FIG. 1B corresponds to a fluidized bed installation in which the insulation sheath around the freeboard has been removed and the temperature in the freeboard is maintained below the fluidized bed temperature of 780° C. This results in a hydraulic material with good compression strength but relatively high emission, indicating an inefficient manufacturing process due at least in part to energy loss.

In FIG. 1C, the same fluidized bed installation is used as in FIG. 1A (i.e., with insulation of the freeboard) in combination with a compaction screw for the conveyance of the paper residue. Because of the improved combustion performance, a homogenous temperature distribution can be achieved which results in very low emission values and good compression strength.

The diameter of the compaction screw facing the fluidized bed installation was half as large as the diameter facing away from the fluidized bed installation.

TABLE B

| | Emission (mg/Nm³ at 11% O₂ in waste gas) | | Compression strength |
| --- | --- | --- | --- |
| | CO | $C_xH_y$ | (MPa) |
| non-compacted feed; insulation | NA | NA | 3.27 ± 0.05 |
| non-compacted feed; no insulation | 238 | 100 | 4.31 ± 0.04 |
| compacted feed; insulation | 190 | <10 | 4.24 ± 0.17 |

NA = not available.

Calcium oxide decreases the compression strength of concrete by reacting with carbon dioxide to form calcium carbonate which increases the volume. According to the present invention, the freeboard of the fluidized bed is used for the conversion of calcium oxide into calcium hydroxide. Preferably, the material spends at most ten minutes in the fluidized bed during processing, more preferably less than five minutes. Furthermore, the material spends at most thirty seconds in the freeboard during processing, preferably less than ten seconds. Because the material undergoing processing spends such a short time in the fluidized bed and the freeboard, the undesirable reaction of metakaolinite with calcium hydroxide and water is limited.

In certain embodiments, the amount of calcium oxide in the product can also be reduced by suppressing the conversion of calcium carbonate by applying methods which influence the chemical balance between calcium carbonate and calcium oxide plus carbon dioxide. For example, the carbon dioxide concentration can be increased by selecting the correct fuel so that the amount of carbon dioxide is increased relative to the energy produced. One example of an appropriate fuel for this purpose is coal since the combustion of this fuel produces more carbon dioxide per energy unit than the combustion of natural gas.

The freeboard of the fluidized bed should be maintained at a temperature below 850° C. preferably below 800° C. This prevents the metakaolinite formed during incineration from being converted into a product having inferior hydraulic properties, as illustrated in FIGS. 1A–1B and Table B.

In order to allow the calcium oxide which is formed during combustion to bind water to form calcium hydroxide, the freeboard or the calcium oxide conversion chamber should be maintained at a temperature of no more than 500° C. preferably between 150° C. and 350° C. This reduced temperature is achieved by cooling the freeboard or calcium oxide conversion chamber so that the absorbed heat can be used for drying the starting material. This can be achieved by introducing water into the freeboard or calcium oxide conversion chamber. To reduce the amount of products formed having inferior hydraulic properties, the water vapour concentration in the freeboard or calcium oxide conversion chamber should be maintained at 30% to 50% by volume. It has been found that using these ranges results in the formation of products having superior hydraulic properties.

The metakaolinite containing solid phase is separated from the water containing gaseous phase at the elevated temperatures which prevent the reaction of water with the metakaolinite. The separation may be performed using a cyclone.

Table C demonstrates that concrete materials formed from a combination of Portland cement combined with hydraulic materials manufactured as described herein are stronger than cement materials formed without such hydraulic materials. The materials were prepared by mixing one part Portland cement with or without a hydraulic material, three parts standard sand and ½ part water according to EN 196. The compression strength was measured after hardening for 14 days.

TABLE C

| Portland cement % | hydraulic material % | Compression strength (MPa) |
|---|---|---|
| 100 | 0 | 39 ± 0.5 |
| 90 | 10 | 44.7 ± 1.6 |

The water formed from the incineration of the starting material may be used to convert calcium oxide. This water may further include fuels used for additional heating of the fluidized bed. Alternatively, the water from incineration of the starting material may also include water directly added to the fluidized bed, preferably the freeboard. The water fed to the freeboard or calcium oxide conversion chamber preferably is abstracted from the residue to be incinerated.

The ultimate composition of hydraulic materials manufactured according to the present invention depends upon the starting material used. In one embodiment, the composition of hydraulic materials manufactured according to the present invention comprises 40% metakaolinite, 50% calcium hydroxide, calcium carbonate, calcium oxide, metals, chlorides and sulphates. The calcium oxide is present in such small amounts that it has a negligible effect on the compression strength of cement in which it is contained. The metals, chlorides and sulphates are present in concentrations that have no adverse effect on the strength and applicability of products which incorporate the hydraulic material.

It is to be noted that an additional benefit of the method of the present invention is the reduced amount of dioxin emissions. In particular, while it is known that careful control of the freeboard can reduce the amount of dioxin emissions, it is surprising that the temperature ranges used during the process of the present invention result in such low dioxin emissions that additional, expensive equipment for the removal of dioxins is not required to satisfy the strict Dutch environmental standard of 0.1 ng $T_{eq}/m_3$. Table D lists the amount of dioxin emitted during the process of the present invention as a function of the temperature of the fluidized bed and the freeboard. This further adds to the economic advantages of the present invention.

TABLE D

| $T_{\text{fluidized bed}}$ °C. | $T_{\text{freeboard}}$ °C. | units of dioxin $ngT_{eq}/m^3$ |
|---|---|---|
| 850 | 850 | 0.35 |
| 780 | 770–780 | 0.034 |

The invention thus permits residues, which otherwise would have to be disposed of at high costs, to be utilized in the manufacture of high-grade hydraulic materials.

Having thus described certain embodiments of the present invention, various alterations, modifications and improvements will be obvious to those skilled in the art. Such alterations, modifications and improvements are intended to be within the scope of the invention. Accordingly, the foregoing description is by way of example only and is not intended as limiting. The invention is limited only as defined in the following claims and the equivalents thereto.

What is claimed is:

1. A method for the thermal conversion of kaolin-containing material to a meta-kaolin containing material comprising treating the kaolin-containing material thermally in a fluidized bed installation having a freeboard in the presence of oxygenous gas wherein the kaolin-containing material used is waste paper or residues that stem from recycling waste paper for reuse in the paper industry, and the fluidized bed is operated at a temperature between 720° C. and 850° C. and the temperature of the freeboard is 850° C. or lower and the fluidized bed is provided with means for promoting heat transfer.

2. The method according to claim 1, wherein the fluidized bed includes a heat transfer agent.

3. The method according to claim 1, wherein the treating of the kaolin-containing material in the fluidized bed is performed at a temperature between 750° C. and 800° C.

4. The method according to claim 3, wherein the treating of the kaolin-containing material in the fluidized bed is performed at a first temperature and the freeboard is at a second temperature, the second temperature being no more than the first temperature.

5. The method according to claim 1, wherein the treating of the kaolin-containing material in the fluidized bed is performed at a temperature of 780° C.

6. The method according to claim 5, wherein the treating of the kaolin-containing material in the fluidized bed is performed at a first temperature and the freeboard is at a second temperature, the second temperature being no more than the first temperature.

7. The method according to claim 1, characterized in that the temperature in the freeboard or a successive calcium oxide conversion chamber is maintained at 500° C. or lower.

8. The method according to claim 1, wherein the method includes:
   absorbing heat from the freeboard; and
   using the heat absorbed from the freeboard in the performing the heating of the kaolin-containing material that is to be thermally treated.

9. The method according to claim 1, wherein the treating of the thermally treated kaolin-containing material in the freeboard is performed at a water vapor concentration of 30% to 50% by volume.

10. The method according to claim 1, further comprising treating the kaolin-containing material in a calcium oxide conversion chamber at a water vapor concentration of 30% to 50%.

11. The method according to claim 1, wherein the treating of the thermally treated kaolin-containing material in the freeboard includes the feeding of water to the freeboard.

12. The method according to claim 11, the feeding of water to the freeboard includes the use of water derived from the kaolin-containing material that is to be incinerated.

13. The method according to claim 1, further comprising treating the kaolin-coating material in a calcium oxide conversion chamber and feeding water into the calcium oxide conversion chamber.

14. The method according to claim 1, wherein the treating of the kaolin-containing material in the fluidized bed includes feeding the kaolin-containing material in a compacted form.

15. The method according to claim 1, further comprising:
   separating a coarse fraction of the metakaolinite material from a fine fraction of the metakaolinite material; and
   feeding the coarse fraction of the metakaolinite material back to the fluidized bed.

16. The method according to claim 1, wherein the treating of the kaolin-containing material in the fluidized bed is performed over a time period of at most ten minutes.

17. The method according to claim 1, wherein the treating of the thermally treated kaolin-containing material in the freeboard is performed over a time period of at most thirty seconds.

18. The method according to claim 1, further comprising a calcium oxide conversion chamber, and wherein the freeboard or the calcium oxide conversion chamber is cooled and the absorbed heat is utilized for drying kaolin-containing material that is to be thermally treated.

* * * * *

UNITED STATES PATENT AND TRADEMARK OFFICE
CERTIFICATE OF CORRECTION

PATENT NO. : 5,868,829
DATED : February 9, 1999
INVENTOR(S) : Joseph Jan Peter Biermann et al.

It is certified that error appears in the above-identified patent and that said Letters Patent is hereby corrected as shown below:

ON THE TITLE PAGE:
Please add the following priority information:
After item [22] insert item [30] Foreign Application Priority Data:
--Aug. 24, 1994 [NL] Netherlands ......94-01366--.

Signed and Sealed this

Twenty-eighth Day of December, 1999

Attest:

Attesting Officer

Q. TODD DICKINSON

Acting Commissioner of Patents and Trademarks